United States Patent
Haller et al.

(10) Patent No.: US 7,809,486 B2
(45) Date of Patent: Oct. 5, 2010

(54) PRESSURE BOOST FOR VEHICLE REAR BRAKE CIRCUITS

(75) Inventors: Mark Haller, Canton, MI (US); Frank Lubischer, Commerce, MI (US); Mark Bartol, Farmington Hills, MI (US); Greg Ginger, Canton, MI (US); Arnold H. Spieker, Commerce Township, MI (US); Mike Romanowski, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 1099 days.

(21) Appl. No.: 11/411,240

(22) Filed: Apr. 25, 2006

(65) Prior Publication Data

US 2006/0287797 A1 Dec. 21, 2006

Related U.S. Application Data

(60) Provisional application No. 60/676,394, filed on Apr. 29, 2005.

(51) Int. Cl.
*G06F 19/00* (2006.01)
(52) U.S. Cl. .............. 701/70; 303/113.5; 303/189
(58) Field of Classification Search ............ 180/248; 701/70, 80, 81, 71; 303/113.5, 113.1, 121, 303/186, 189
See application file for complete search history.

(56) References Cited

U.S. PATENT DOCUMENTS

| | | | |
|---|---|---|---|
| 3,937,523 A | 2/1976 | Ayers, Jr. et al. | |
| 3,980,344 A | 9/1976 | Burckhardt | |
| 4,261,624 A * | 4/1981 | Plantan | 303/7 |
| 4,652,060 A | 3/1987 | Miyake | |
| 4,659,153 A | 4/1987 | Klein | |
| 4,699,436 A | 10/1987 | Klein | |
| 4,746,173 A | 5/1988 | Fennel et al. | |
| 4,824,183 A * | 4/1989 | Uchida et al. | 303/122.07 |
| 4,826,257 A | 5/1989 | Burckhardt et al. | |
| 4,835,695 A * | 5/1989 | Walenty et al. | 701/79 |
| 4,865,399 A * | 9/1989 | Atkins et al. | 303/116.2 |
| 4,962,971 A | 10/1990 | Miyake | |
| 5,011,236 A | 4/1991 | Toepfer et al. | |
| 5,015,040 A | 5/1991 | Lin | |
| 5,040,854 A | 8/1991 | Arikawa | |
| 5,058,961 A | 10/1991 | Mergenthaler et al. | |
| 5,061,017 A | 10/1991 | Kirstein | |
| 5,125,721 A | 6/1992 | Schmidt et al. | |

(Continued)

FOREIGN PATENT DOCUMENTS

EP 0 062 246 A1 10/1882

(Continued)

OTHER PUBLICATIONS

European Office Action to Application No. 06 008 704.6 - 2423, Ref. EPA-98 574, dated May 21, 2010.

*Primary Examiner*—Khoi Tran
*Assistant Examiner*—Stephen Holwerda
(74) *Attorney, Agent, or Firm*—MacMillan, Sobanski & Todd, LLC (57) ABSTRACT

Under certain operating conditions, the pressure applied to a vehicle rear brake circuit is increased above the pressure applied to the vehicle front brake circuit to enhance stopping of the vehicle.

21 Claims, 9 Drawing Sheets

U.S. PATENT DOCUMENTS

| | | |
|---|---|---|
| 5,150,950 A | 9/1992 | Arikawa et al. |
| 5,163,742 A | 11/1992 | Töpfer et al. |
| 5,217,287 A | 6/1993 | Matsuda |
| 5,219,210 A | 6/1993 | Maehara |
| 5,281,012 A * | 1/1994 | Binder et al. ............ 303/113.5 |
| 5,282,674 A | 2/1994 | Matsuda |
| 5,335,935 A | 8/1994 | Proos et al. |
| 5,390,987 A | 2/1995 | Willi et al. |
| 5,558,414 A * | 9/1996 | Kubota ................. 303/122.08 |
| 5,558,415 A | 9/1996 | Buschmann et al. |
| 5,584,541 A * | 12/1996 | Sone et al. .................. 303/146 |
| 5,620,241 A | 4/1997 | Burgdorf |
| 5,632,535 A * | 5/1997 | Luckevich et al. .......... 303/186 |
| 5,826,954 A | 10/1998 | Schmitt et al. |
| 6,241,326 B1 * | 6/2001 | Ferguson et al. ......... 303/116.2 |
| 6,357,836 B1 * | 3/2002 | Schmitt et al. ........... 303/113.5 |
| 6,367,892 B1 | 4/2002 | Proger et al. |
| 6,443,540 B2 * | 9/2002 | Shimizu et al. ............. 303/177 |

FOREIGN PATENT DOCUMENTS

| | | |
|---|---|---|
| EP | 0 713 812 A2 | 5/1996 |
| EP | 1 104 731 A2 | 6/2001 |
| GB | 1 431 466 | 4/1976 |
| GB | 2 136 519 B | 1/1987 |
| GB | 2 135 413 B | 2/1987 |

* cited by examiner

PRESSURE BOOST FOR VEHICLE REAR BRAKE CIRCUITS

CROSS-REFERENCE TO RELATED APPLICATIONS

This application claims the benefit of U.S. Provisional Application No. 60/676,394, filed Apr. 29, 2005, the disclosure of which is incorporated herein by reference.

BACKGROUND OF THE INVENTION

This invention relates in general to vehicle brake systems and in particular to an algorithm for boosting the pressure in the rear circuits of such a brake system to provide enhanced braking when the vehicle is heavily loaded and/or towing a trailer.

Typically, vehicles are equipped with hydraulic brake systems having a dual master cylinder which includes separate front and rear hydraulic brake fluid reservoirs and actuating chambers. The front and rear actuating chambers are connected to front and rear brake cylinders, respectively, to define separate front and rear brake circuits. Depressing a brake pedal, which is connected by a mechanical linkage to the master cylinder, applies hydraulic pressure through both brake circuits to the brake cylinders at each of the vehicle wheels. The brake cylinders actuate the front and rear wheel brakes to slow the vehicle. By dividing the brake system into front and rear brake circuits, braking capability is maintained if a brake fluid leak should develop in one of the brake circuits.

Figure 1:
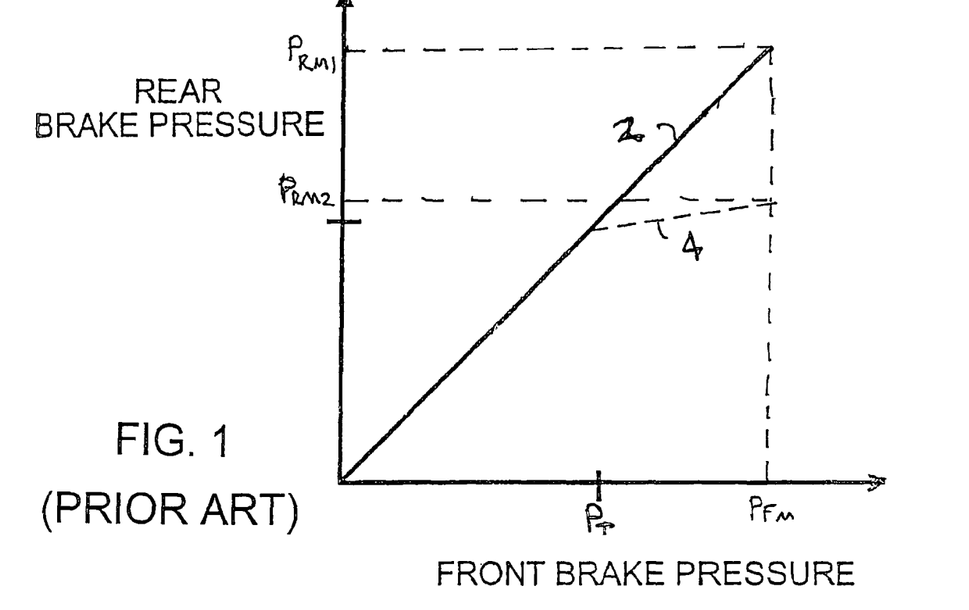
FIG. 1 is graph illustrating the relationship between front and rear brake circuit pressures for known brake systems.

Referring now to the drawings, a graph of rear brake pressure as a function of front brake pressure is shown in FIG. 1. Upon application of the brakes, equal pressure is applied to both front and rear brake circuits, as illustrated by the line labeled 2 in FIG. 1. The pressure increases linearly until maximum pressures are reached for the front and rear brake circuits, which are labeled $P_{FM}$ and $P_{RM1}$, respectively. While an idealized linear relationship is shown in FIG. 1, it will be appreciated that a non-linear relationship may also exist between the front and rear brake circuit pressures (not shown).

During a braking cycle, a portion of the weight of a vehicle may be transferred from the rear vehicle wheels to the front vehicle wheels. The transfer of weight increases the frictional force produced between the front vehicle wheels and the road surface while decreasing the frictional force produced between the rear vehicle wheels and the road surface. Accordingly, if an equal braking force is applied to the front and rear vehicle wheels, the transfer of vehicle weight between the rear and front wheels could cause the rear wheels to lock up while the front wheels continue to rotate. A vehicle with locked rear wheels and rotating front wheels could spin-out easily.

To maintain directional stability during a braking cycle, the front wheels must lock up before the rear wheels. The use of brakes having a higher output on the front wheels results in a greater braking force being applied to the front wheels than the rear wheels when the same hydraulic pressure is applied to the front and rear brake cylinders.

On a low mu road surface, little or no weight is transferred from the rear to the front of a vehicle during a braking cycle. Thus, the higher output design of the front brakes is usually sufficient on low mu surfaces to assure that the front wheel brakes lock up before the rear wheel brakes, thereby preserving vehicle directional stability.

On high mu surface roads, however, the greater coefficient of friction of the road surface allows a harder brake application with a corresponding greater vehicle deceleration. The increase in vehicle deceleration results in a transfer of vehicle weight from the rear wheels to the front wheels. With the transfer of vehicle weight, the design of the brake calipers may not be sufficient to assure that the front brakes lock up before the rear brakes. Accordingly, a proportioning valve is typically included in the rear brake circuit.

The proportioning valve is operative to increase the hydraulic pressure applied to the rear wheel brake cylinders at a slower rate than the rate of increase of the hydraulic pressure applied to the front wheel brake cylinders, as illustrated by the line labeled 4 in FIG. 1. The proportioning valve is operative only after a predetermined brake pressure threshold, identified as $P_T$ in FIG. 1, has been exceeded. For hydraulic pressures below the threshold, the same hydraulic pressure is applied to both the front and rear brake cylinders. Also, the pressure applied to the rear brake circuit is limited to a maximum value, $P_{RM2}$, which, as shown in FIG. 1, is less than the maximum front brake circuit pressure $P_{FM}$. The different rates of increase result in a greater braking effort occurring at the front wheel brakes than at the rear wheel brakes such that the front wheel brakes lock up before the rear wheel brakes.

Currently, many vehicles are equipped with electronically controlled brake systems that include selectively controlled solenoid valves in the front and rear brake circuits to enhance control of the vehicle. Such systems include Anti-Lock Brake Systems (ABS), Traction Control Systems (TCS) and/or a Vehicle Stability Control Systems (VSC) and are typically actuated upon detection of a vehicle dynamic parameter exceeding a predetermined threshold. For example, an ABS is typically actuated upon detection of excessive wheel slip prior to the wheel locking up. Following actuation of the system, the solenoid valves are selectively operated to first isolate the affected vehicle wheel brakes from the vehicle master cylinder and then to control the hydraulic pressure applied to the wheel brakes to correct the problem. In place of a proportioning valve, an electronically controlled brake system may be utilized to proportion the pressure applied to the front and rear wheel brakes. One such electronic proportioning system is described in U.S. Pat. No. 6,357,836 where, above a predetermined pressure threshold, the pressure applied to the rear brake circuit is less than the pressure applied to the front brake circuit.

However, under certain conditions, such as when a vehicle is towing a trailer or is heavily loaded, as with a truck, the rear longitudinal tire force may not be fully utilized. Accordingly, it would be desirable, under such conditions, to apply a pressure to the rear brake circuit that is greater than the pressure applied to the front brake circuit in order to reduce the vehicle stopping distance.

BRIEF SUMMARY OF THE INVENTION

This invention relates to an algorithm for boosting the hydraulic pressure in the rear circuits of a vehicle hydraulic brake system to provide enhanced braking when the vehicle is heavily loaded and/or towing a trailer.

The present invention contemplates a vehicle brake system that includes separate front and rear wheel brake circuits and a plurality of wheel speed sensors, with at least one front wheel speed sensor and at least one rear wheel speed sensor. The system also includes a control unit connected to the front and rear wheel brake circuits and the wheel speed sensors, the control unit being operative during a brake application, and upon determining that an operating condition exists, to increase the pressure applied to the rear wheel brakes.

In the preferred embodiment, the operating condition is wheel speed and the control unit is operable when the rear wheel speed exceeds the front wheel speed to increase the pressure applied to the rear wheel brakes above the pressure applied to the front wheel brakes. The system increases the rear brake pressure in increments that are a function of the difference between the front and rear wheel speeds. Alternately, the operating condition may be wheel slip and the control unit is operable to calculate a front wheel slip and a rear wheel slip and to increase the pressure applied to the rear wheel brakes above the pressure applied to the front wheel brakes when the rear wheel slip is less than the front wheel slip. The alternate system increases the rear brake pressure in increments that are a function of the difference between the front and rear wheel slips.

The present invention also contemplates a method for controlling the application of vehicle rear brakes for a vehicle having front and rear brake circuits. The method includes the steps of providing a plurality of wheel speed sensors, with at least one front wheel speed sensor and at least one rear wheel speed sensor and a control unit connected to the front and rear wheel brake circuits and the wheel speed sensors. The method further includes the steps of monitoring the front and rear wheel speeds and comparing the monitored front and wheel speeds. Upon the rear wheel speed exceeding the front wheel speed during a brake application, the control unit causes the rear wheel brake pressure to be increased above the front wheel brake pressure. The method increases the rear brake pressure in increments that are a function of the difference between the front and rear wheel speeds. Alternately, front and rear wheel slips are calculated and, during a brake application, the rear wheel brake pressure is increased above the rear wheel brake pressure when the rear wheel slip is less than the front wheel slip. The alternate method increases the rear brake pressure in increments that are a function of the difference between the front and rear wheel slips.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
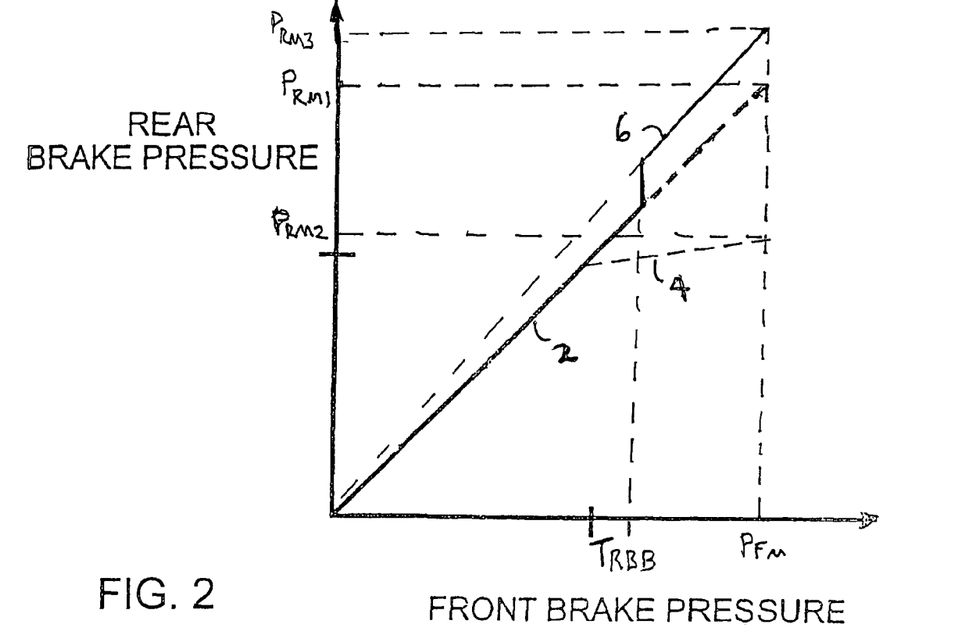
FIG. 2 is a graph illustrating the relationship between front and rear brake circuit pressures for a brake system in accordance with the present invention.

The present invention contemplates boosting the rear brake circuit pressure in a vehicle brake system under certain operational conditions. Referring again to the drawings, there is illustrated in FIG. 2, the response of a vehicle brake system in accordance with the present invention. Curves shown in FIG. 2 that are similar to curves shown in FIG. 1 have the same numerical identifiers. Also, while linear relationships between the front and rear brake circuit pressures are shown, it will be appreciated that the invention also may be practiced with a non-linear relationship between the pressures (not shown). The response, which is labeled 6, represents the relationship between front and rear brake circuit pressures when rear brake boost conditions exist. Under normal operating conditions, the brake pressures will follow the line labeled 2, if proportioning is not included in the brake system, or the pressures will follow the line labeled 4, if proportioning is included in the brake system. However, upon detection of certain operating conditions, which is indicated by the Rear Brake Boost trigger, $T_{RBB}$, the brake system will transition to the boosted line labeled 6, as shown in FIG. 2 by the short vertical line between the lines 2 and 6. The rear brake circuit pressure will then follow the boosted pressure line labeled 6, which is above the front brake pressure shown by the line labeled 2. In the preferred embodiment, the operating condition that triggers the rear brake boost is an increased load upon the rear of the vehicle, such as occurs with a loaded truck or when the vehicle is towing a trailer. Also, in the preferred embodiment, the rear brake boost is included in a vehicle brake system that includes electronic control.

Figure 3:
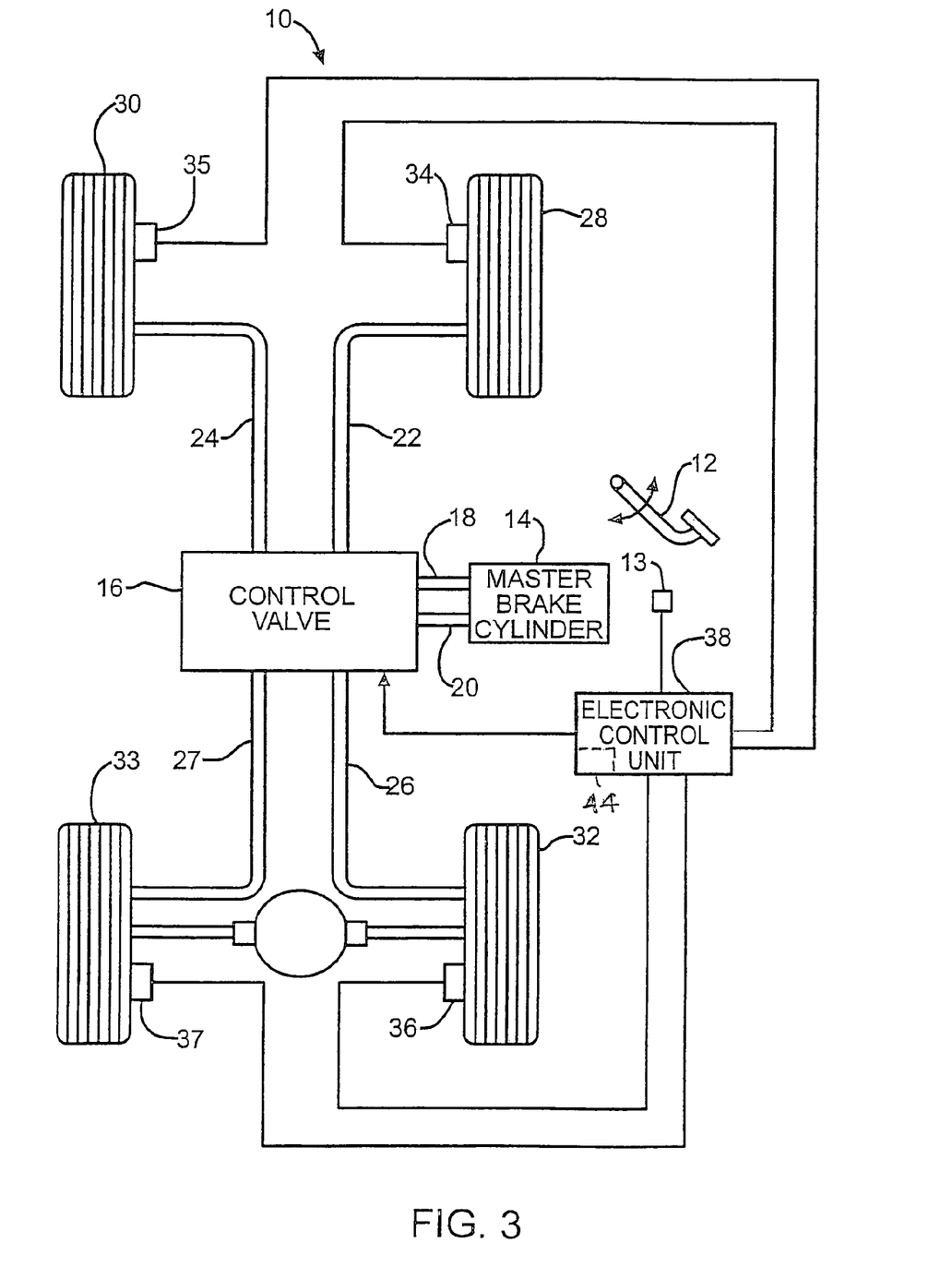
FIG. 3 is a schematic diagram of a typical electronically controlled brake system that includes the present invention.

Referring now to the drawings, there is illustrated in FIG. 3 a typical hydraulic brake system 10 that includes an electronic brake control capability. The system 10 is intended to be exemplary and it will be appreciated that there are other brake control system configurations that may be utilized to implement the present invention. The brake system 10 shown is for a rear wheel drive vehicle. The system 10 includes a brake pedal 12 that is mechanically connected to a brake light switch 13 and a dual reservoir master cylinder 14. A first reservoir of the master cylinder 14 supplies hydraulic fluid a front wheel brake circuit that includes the two front wheel brakes while the second reservoir provides hydraulic brake fluid to a rear wheel brake circuit that includes the two rear wheel brakes. Such a brake system is commonly referred to as a front axle/rear axle, or vertically split, brake system.

The master cylinder first reservoir is connected to an electronic brake control valve 16 by a first hydraulic line 18 while the second reservoir is connected to the control valve 16 by a second hydraulic line 20. The control valve 16 includes plurality of normally open and normally closed solenoid valves (not shown) and a separate source of pressurized hydraulic fluid, such as a motor driven pump (not shown). The pump is typically included within the body of the control valve 16 while the pump motor is mounted upon the exterior thereof.

The control valve 16 is connected by a first pair of hydraulic brake lines 22 and 24 to right and left front vehicle wheels 28 and 30, respectively. For the vehicle shown in FIG. 1, the front wheels 28 and 30 are non-driven but steerable. However, the electronic brake control system can also be applied to vehicles having front wheel and/or all wheel drive. Similarly, a second pair of hydraulic brake lines 26 and 27 connect the control valve 16 to right and left rear vehicle wheels 32 and 33, respectively.

Typically, the control valve 16 includes a normally open solenoid valve (not shown) between each of the brake circuits and the corresponding master cylinder reservoir. Upon actuation, the normally open valves close to isolate the brake circuits from the master cylinder 14. Accordingly, the valve is typically referred to as an isolation valve. Because the circuit isolation valves may be selectively actuated when a TC function is activated, the valves also may referred to as TC valves. For optimal control of the speed of each of the vehicle wheels, each of the wheel brakes can be provided an associated isolation valve. The control valve 16 also typically includes a first normally closed valve (not shown) for each wheel brake that connects the wheel brake cylinder with a brake fluid reservoir (not shown), such as a low pressure acculumlator. Upon actuation, the first normally closed valve is opened to bleed hydraulic fluid from the wheel brake cylinder and thereby reduce the pressure applied to the wheel brake. Accordingly, the first normally closed valve is usually referred to as a dump valve. Additionally, the control valve 16 usually includes a second normally closed valve (not shown) for each wheel brake that connects the wheel brake cylinder with an outlet port of the pump. Upon actuation, the first normally closed valve is opened to supply pressurize hydraulic fluid from the pump to the wheel brake cylinder and thereby raise the pressure applied to the wheel brake. Accordingly, the second normally closed valve is usually referred to as an apply valve. Usually, the reservoir connected to the dump valves is connected through a check valve to a pump inlet port and thereby supplies hydraulic brake fluid to the motor driven pump. Additionally, the pump inlet port may be connected through a normally closed supply valve to the master cylinder reservoir.

The speed of the front wheels 28 and 30 are monitored by a first pair of wheel associated wheel speed sensors, 34 and 35, respectively. Similarly, the speed of the rear wheels 32 and 33 are monitored by a second pair of associated wheel speed sensors 36 and 37, respectively. Alternately, a single wheel speed sensor (not shown) may be used to monitor the rear wheel speed. Typically, the single rear wheel speed sensor would be mounted upon the vehicle differential and would produce a signal the is proportional to the average of the individual rear wheel speeds. The wheel speed sensors 34, 35, 36 and 37 are electrically connected to an Electronic Control Unit (ECU) 38. The ECU 38 is also electrically connected to the bake light switch 38. Closing the brake light switch 13 provides a signal to the ECU 38 that the vehicle brakes have been activated. The ECU 38 also is electrically connected to the pump motor and the actuation coils of the solenoid valves included with the control valve 16. The ECU 38 further includes a microprocessor 44 with a memory that stores a brake control algorithm.

During vehicle operation, the microprocessor in the ECU 38 continuously receives speed signals from the wheel speed sensors 34, 35, 36 and 37. The ECU 38 is operative, based upon sensor input, to select a mode of operation and then to selectively activate the pump motor and solenoid valves to correct potential problems in the vehicle dynamics. For example, during a brake application, the microprocessor 44 in the ECU 38 calculates a theoretical speed ramp that represents the speed the vehicle would travel is decelerated at a predetermined maximum rate, such as 1.0 g. The microprocessor 44 continues to monitor the speed of the wheel relative to both the actual wheel speed and theoretical speed ramp. When the microprocessor 44 detects that the wheel deceleration has reached a predetermined threshold value, such as 1.3 g, the microprocessor 44 enters an ABS mode of operation and causes the isolation valve associated with the wheel brake to close, limiting the pressure applied to the wheel cylinder of a constant level.

When the difference between the actual wheel speed and the calculated speed ramp exceeds a predetermined slip threshold $S_t$, it is an indication that a predetermined slippage is occurring between the actual wheel speed and the vehicle speed and that the wheel has potential to lock-up. At this point, it is desirable to selectively reduce the pressure of the hydraulic fluid being applied to the wheel cylinder and the ECU microprocessor 44 applies a series of pulses to the dump valve associated with the wheel cylinder to lower pressure sufficiently to cause the wheel to spin back up to the vehicle speed.

After the wheel speed attains the vehicle speed, the ECU microprocessor 44 applies a series of pulses to the apply valve associated with the wheel cylinder to raise the pressure. These pulses precipitate a second wheel speed departure. Upon correction of the second wheel speed departure with a second series of dump pulses, the currently applied pressure, while lower that the initial pressure, is greater than the pressure present after correction of the first wheel speed departure. Thus, the electronic brake control system 10 provides control over the individual wheel speeds by switching between hold, dump and apply modes of operation of the solenoid valves included in the control valve 16.

Because the speed of each wheel is monitored separately, the microprocessor 44 in the ECU 38, may also cause the system 10 to function in a Traction Control System (TCS) mode and/or a Vehicle Stability Control System (VCS) mode upon detecting triggering levels in the monitored vehicle parameters. Also, a brake proportioning function may be provided by the electronic brake control system 10 during a vehicle stop. The control system 10 actuates the rear brake isolation valve and then selectively actuates the rear dump and apply valves to provide a brake pressure to the rear brake circuit pressure that is lower than the brake pressure provided to the front brake circuit.

As described above, the present invention contemplates a control algorithm that boosts the rear brake circuit pressure over the front brake circuit pressure under certain operating conditions to improve the vehicle braking efficiency. In the preferred embodiment, the control algorithm is included as a subroutine of the main electronic brake control algorithm and utilizes the components included in the electronic brake control system 10.

Figure 4:
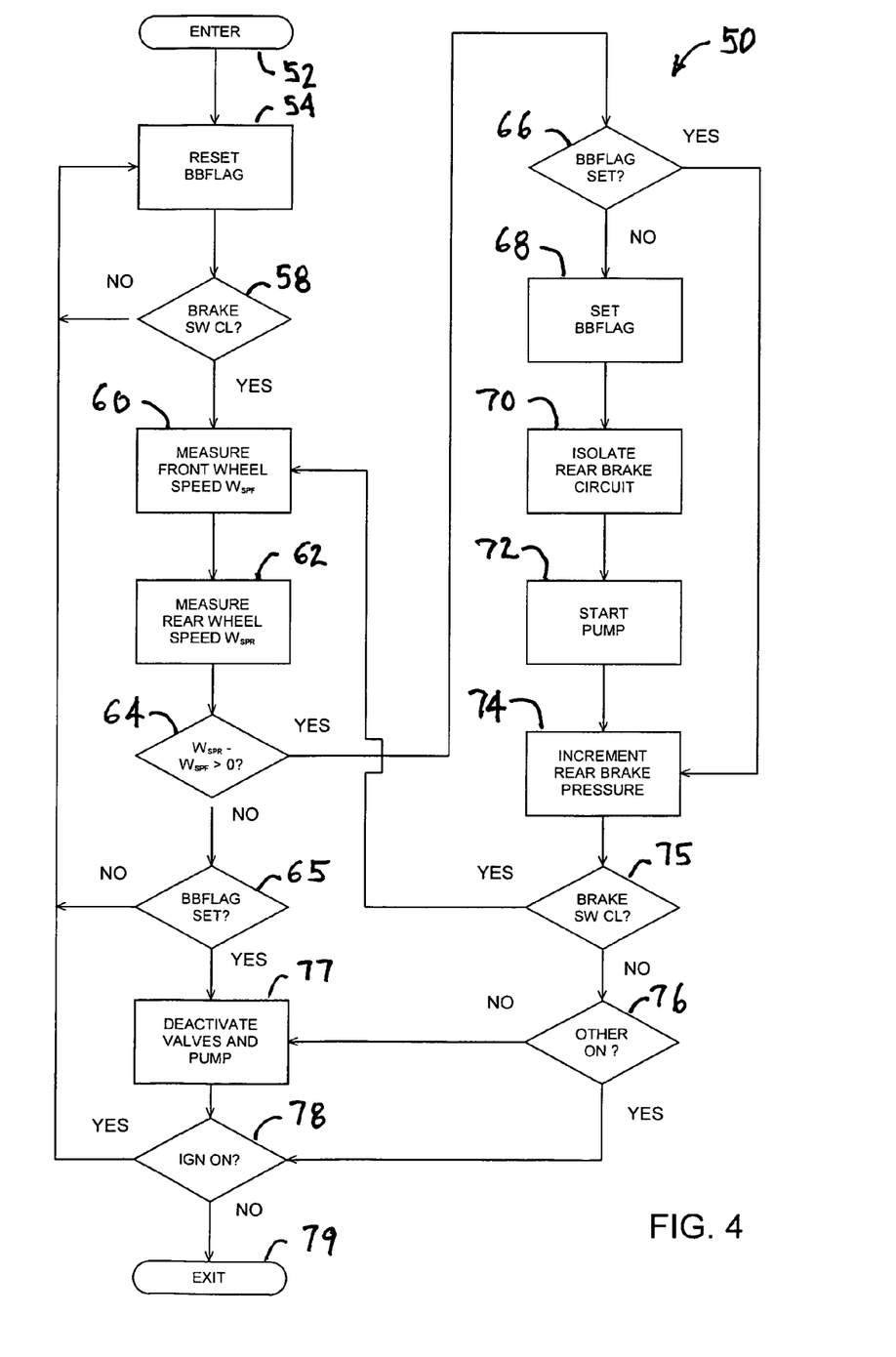
FIG. 4 is a flow chart for an algorithm for boosting rear brake circuit pressure when the electronically controlled brake system shown in FIG. 3 is inactive that is in accordance with the present invention.

Referring now to FIG. 4, there is shown a flow chart 50 for the algorithm that would be used when the electronic brake control system is not active. The flow chart 50 is entered through block 52 and proceeds to functional block 54 where a Brake Boost Flag, BBFLAG is reset. The BBFLAG is set to indicate that the brake boost algorithm is actively increasing the rear brake circuit pressure. The algorithm then continues to decision block 58.

In decision block 58, the algorithm determines whether a brake application is occurring. As shown in the flow chart, in the preferred embodiment, braking is confirmed when the brake light switch 13 is closed; however, other criteria also may be utilized. If, in decision block 58, the algorithm determines that a braking cycle is not occurring, the algorithm transfers back to block 54 and remains in a loop until detection of a brake application occurs. If a braking cycle is occurring, the algorithm transfers to functional block 60.

In functional block 60, the algorithm determines a vehicle front wheel speed, $W_{SPF}$, which may be either an individual speed for each front wheel or an average of both front wheel speeds and then continues to functional block 62. In functional block 62, algorithm determines a vehicle rear wheel speed, $W_{SPR}$, which may be either an individual speed for each rear wheel or an average of both rear wheel speeds and then continues to decision block 64.

In decision block 64, the criteria for applying rear brake circuit boost is checked. In the preferred embodiment, the criteria consists of determining whether the rear wheel speed exceeds the front wheel speed, which occurs when the vehicle is heavily loaded or pulling a trailer. Accordingly, in the preferred embodiment, the average front wheel speed is subtracted from the average rear wheel speed. Alternately, the wheel speed of the front right wheel may be subtracted from the wheel speed of the right rear wheel, or, conversely, the wheel speed of the front left wheel may be subtracted from the wheel speed of the left rear wheel. If the difference in decision block 64 is less than or equal to zero, the algorithm transfers to decision block 65 where the BBFLAG is checked. If the BBFLAG is not set, as would occur on the first and subsequent iterations while the criteria for applying rear brake boost remains absent in decision block 64, the algorithm transfers back to decision block 54 and then continues as described above. If, in decision block 64, the difference between the front and rear wheel speeds is greater than zero, the algorithm activates the rear brake boost function by transferring to decision block 66.

The invention also contemplates utilizing an alternate criteria in decision block 64 in which a function of the front wheel speed is used to determine whether or not to activate the rear brake boost (not shown). With the alternate criteria, the following formula is used in decision block 64:

$$W_{SPR} - f(W_{SPF}) > 0?,$$

where $W_{SPR}$ is the rear wheel speed, and $W_{SPF}$ is the front wheel speed.

With regard to the function shown above, the invention contemplates that several functional relationships may be utilized. For example, a linear functional relationship may be used, as given by:

$$f(W_{SPF}) = K * W_{SPF},$$

with K being greater than one. Alternately, the functional relationship may simply be defined by an offset, as given by:

$$f(W_{SPF}) = W_{SPF} + \text{Offset}.$$

Furthermore, the functional relationship include both of the above relationships, as given by:

$$f(W_{SPF}) = K * W_{SPF} + \text{Offset}.$$

It will be appreciated that the invention also may be practiced with a similar functional relationship for the rear wheel speed, in which case the criteria used in decision block 64 becomes:

$$f(W_{SPR}) - W_{SPF} > 0?$$

Additionally, a functional relationship for both front and rear wheel speeds may be used, in which case the criteria used in decision block 64 becomes:

$$f_1(W_{SPR}) - f_2(W_{SPF}) > 0?$$

where $f_1$ and $f_2$ may, or may not, represent the same functional relationship. Also, while a linear multiplier K was shown above, it will be appreciated that the invention also may be practiced with an non-linear wheel speed relationship (not shown).

In decision block 66, the algorithm determines whether the current iteration is the first iteration following activation of rear brake boost by checking the Brake Boost Flag, BBFLAG. If the BBFLAG is not set, the present iteration is the first iteration, and the algorithm transfers to functional block 68, where the BBFLAG is set. The algorithm then continues to functional block 70 where the microprocessor 44 closes the appropriate valve to isolate the rear brake circuit. The algorithm continues to functional block 72 where the microprocessor 44 starts the pump motor to provide hydraulic fluid to the rear brake circuit at a pressure that exceeds the front brake circuit pressure. The pump supplied hydraulic fluid is supplied only to the rear brake circuit, either by selective operation of the apply valves to block supply of the pressurized fluid to the front bake circuit or by providing separate pumps for the front and rear brake circuits. The algorithm then proceeds to functional block 74 where the microprocessor 44 opens the apply valve for the rear brake circuit to incrementally increase the rear brake pressure over the front brake circuit pressure. The magnitude of the incremental pressure increase is determined by the time duration that the rear brake circuit apply valve is held open, which is a function of the difference between the front and rear wheel speeds. For example, the magnitude of the incremental pressure increase may be either a linear or a non-linear function of the difference between the front and rear wheel speeds and may include an initial offset and/or an offset added to each increment. The invention contemplates a functional relationship such that for heavier loads, the rear brake boost is more aggressively applied. The algorithm then advances to decision block 75 to again determine whether the brake application is continuing. As shown in the flow chart, in the preferred embodiment, braking is again confirmed in decision block 75 where, in the preferred embodiment, the brake light switch 13 is checked; however, other criteria also may be utilized. If, in decision block 75, the brake light switch 13 is still closed, the algorithm transfers to functional block 60 where the front wheel speed $W_{SPF}$ is again measured. The algorithm then continues as described above.

If, in decision block 75, the algorithm determines that the brake light switch 13 is open because the vehicle operator has released the vehicle brakes, the algorithm transfers to decision block 76, where the algorithm determines whether any other brake control functions are active, such as, for example TC or VSC. If no other brake functions are active, the algorithm then transfers to block 77 where the valves and pump motor are deactivated to include opening the rear brake circuit dump valve to drain the pressurized brake fluid from the circuit. The algorithm then transfers to decision block 78 to determine whether the algorithm should remain active. If, in decision block 76, the algorithm determines that other brake functions are active, activation of the valves and pump is still needed and the algorithm transfers directly to decision block 78.

In decision block 78, in the preferred embodiment, the algorithm checks the ignition switch, however, other criteria may be utilizes. If the ignition is off, the algorithm exits through block 79. If, in decision block 78, the ignition is on, the algorithm transfers to functional block 54 where the BBFLAG is reset and then continues as described above.

During a braking cycle the algorithm continually checks that the requirement for the rear brake boost function remains. Thus, if the activation criteria shown in decision block 64 is not met, that is, the difference between the rear wheel and front wheel speeds is less than or equal to zero, the algorithm transfers to decision block 65 where the BBFLAG is checked. If, in decision block 65, the BBFLAG is not set, it is an indication that either the brake boost function has not been activated or has been cancelled during an earlier iteration. Accordingly, the algorithm transfers to functional block 54 and continues as described above. If, in decision block 65, the BBFLAG is set, it is an indication that the brake boost function had been activated in a previous iteration, but the criteria for activation is no longer present. Accordingly, the algorithm then transfers to decision block 77 to deactivate the valves and pump. The algorithm then continues as described above.

The invention also contemplates setting a maximum threshold for the rear brake circuit pressure. Upon reaching the maximum pressure threshold, the algorithm stops increasing the rear circuit brake pressure and holds the current pressure; however, for the clarity, this function is not shown in FIG. 4.

Figure 5:
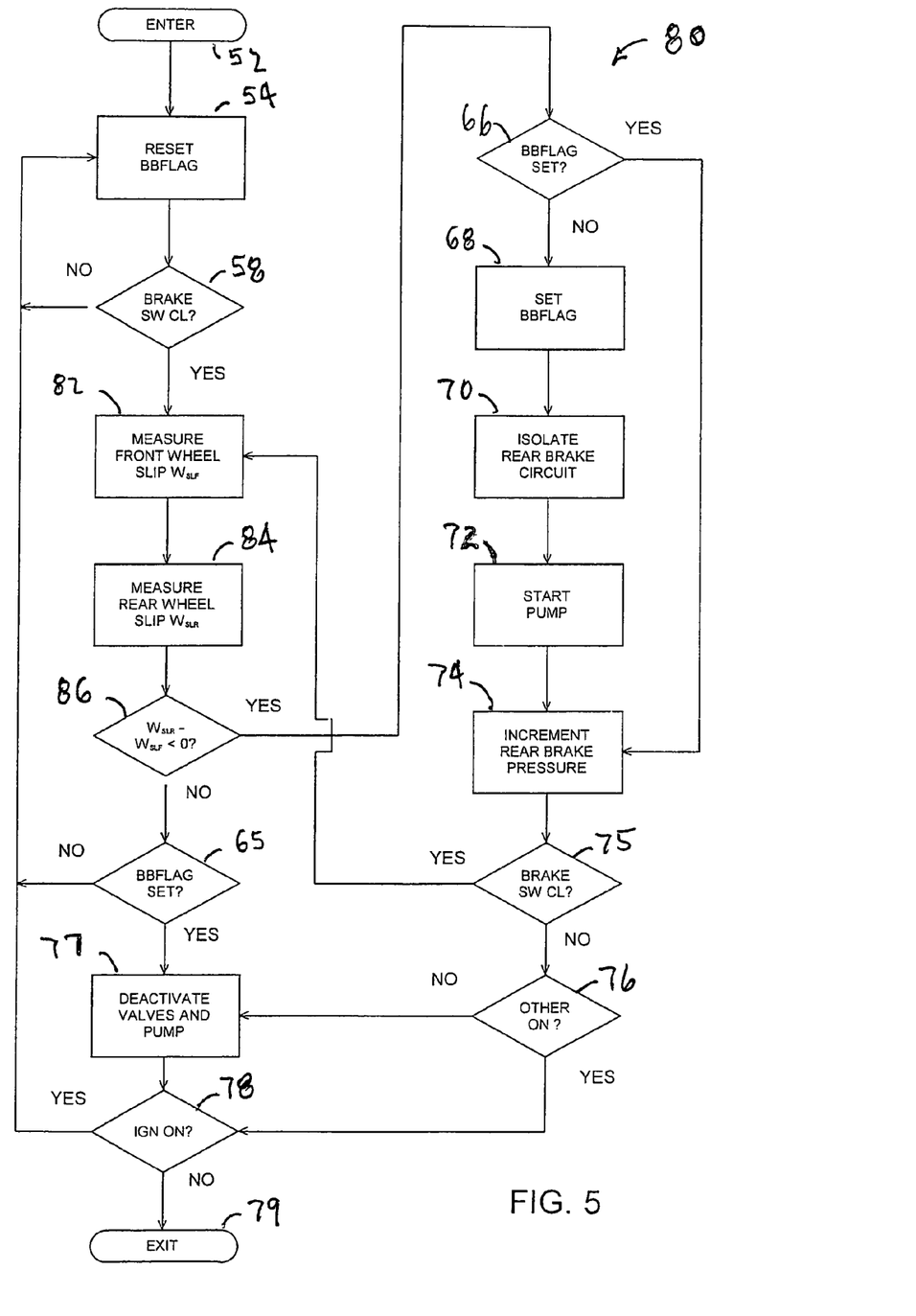
FIG. 5 is a flow chart for an alternate embodiment of the algorithm shown in FIG. 4.

An alternate embodiment of the algorithm is illustrated by the flow chart 80 shown in FIG. 5, where blocks that are the same as shown in FIG. 4 have the same numerical identifiers. The alternate embodiment utilizes wheel slip as the criteria for activating the rear brake circuit boost algorithm. Thus, following determination that the brake switch is closed in decision block 58, the algorithm transfers to functional block 82 where a front wheel slip, $W_{SLF}$, is measured. As before, the front wheel slip, $W_{SLF}$, may be either an average value for both front wheels or individual values for each of the front wheels. The algorithm then advances to functional block 84 where a rear wheel slip, $W_{SLR}$, is measured. As before, the rear wheel slip, $W_{SLR}$, may be either an average value for both rear wheels or individual values for each of the rear wheels. The algorithm continues to decision block 86 where the criteria for applying rear brake boost is checked. In the preferred embodiment, the criteria comprises subtracting the average front wheel slip, $W_{SLF}$, from the average rear wheel slip, $W_{SLR}$. If the difference between the front and rear wheel slips is less than zero, the rear brake boost is activated and the algorithm transfers to decision block 66 and then proceeds as described above to incrementally increase the pressure in the rear brake circuit. If, however, the difference is greater than or equal to zero, the rear brake boost is not activated and the algorithm 65 where the BBFLAG is checked. If the BBFLAG is not set, as would occur on the first and subsequent iterations while the criteria for applying rear brake boost remains absent in decision block 64, the algorithm transfers back to decision block 54 and then continues as described above. Additionally, in functional block 74, the incremental pressure increase is a function of the difference between the front and rear wheel slips. For example, the magnitude of the incremental pressure increase may be either a linear or a non-linear function of the difference between the front and rear wheel slips and may include an initial offset and/or an offset added to each increment.

The invention also contemplates utilizing an alternate criteria in decision block 86 in which a function of the front wheel slip is used to determine whether or not to activate the rear brake boost (not shown). With the alternate criteria, the following formula is used in decision block 86:

$$W_{SLR}-f(W_{SLF})<0?,$$

where $W_{SLR}$ is the rear wheel slip, and
$W_{SLF}$ is the front wheel slip.

With regard to the function shown above, the invention contemplates that several functional relationships may be utilized. For example, a linear functional relationship may be used, as given by:

$$f(W_{SLF})=K*W_{SLF},$$

with K being greater than one. Alternately, the functional relationship may simply be defined by an offset, as given by:

$$f(W_{SLF})=W_{SLF}+\text{Offset}.$$

Furthermore, the functional relationship include both of the above relationships, as given by:

$$f(W_{SLF})=K*W_{SLF}+\text{Offset}.$$

It will be appreciated that the invention also may be practiced with a similar functional relationship for the rear wheel slip, in which case the criteria used in decision block 86 becomes:

$$f(W_{SLR})-W_{SLF}<0?$$

Additionally, a functional relationship for both front and rear wheel slips may be used, in which case the criteria used in decision block 64 becomes:

$$f_1(W_{SLR})-f_2(W_{SLF})<0?$$

where $f_1$ and $f_2$ may, or may not, represent the same functional relationship. Also, while a linear multiplier K was shown above, it will be appreciated that the invention also may be practiced with an non-linear wheel slip relationship (not shown).

Figure 6:
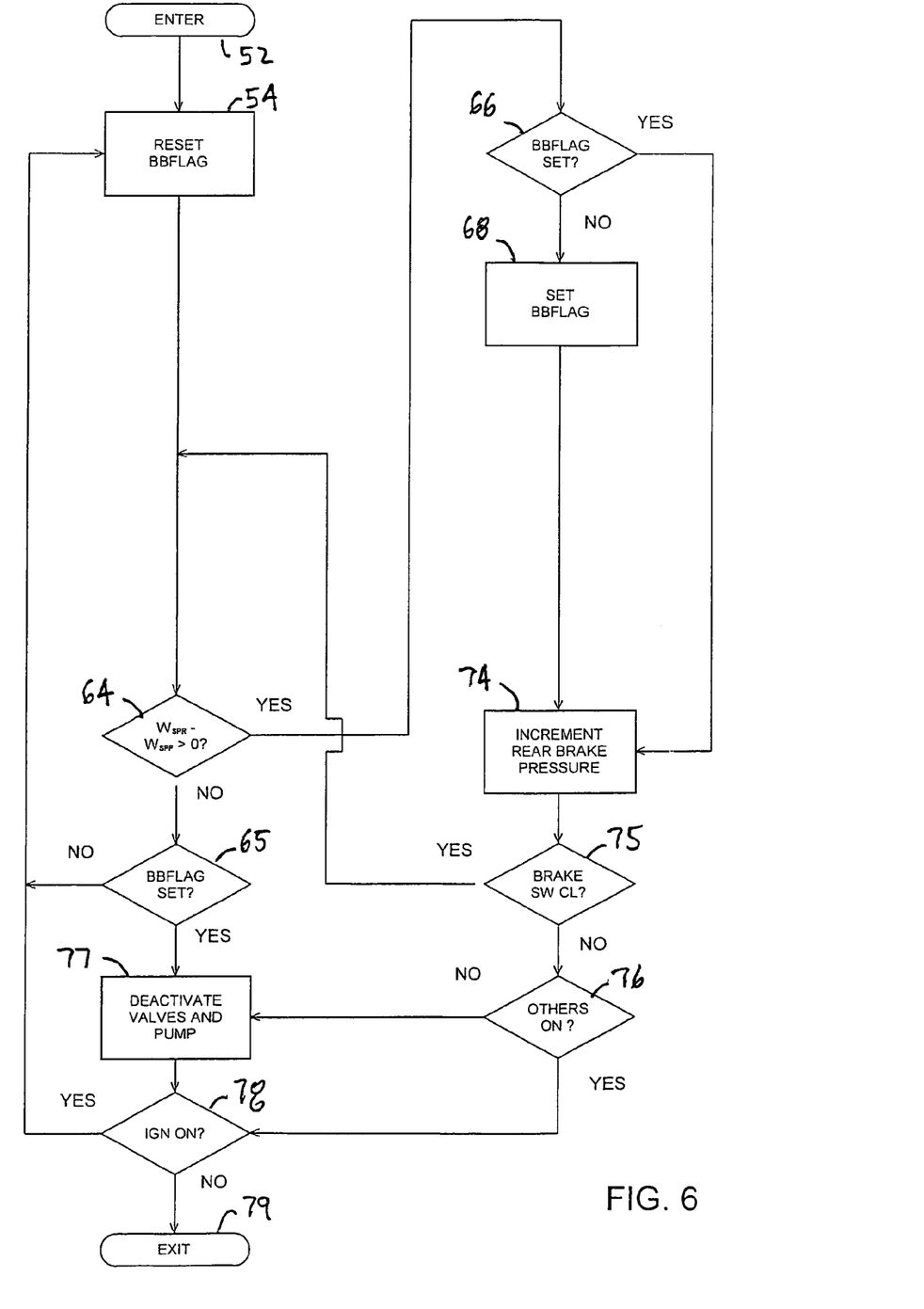
FIG. 6 is a flow chart for another alternate embodiment of the algorithm shown in FIG. 4 that is used when the electronically controlled brake system is active.

The invention also contemplates alternate embodiments of the algorithm that would be used when the algorithm is included as a subroutine in an electronic brake control system and one of the electronic brake control system modes of operation is active. When the electronic brake control system is active, several of steps illustrated in FIGS. 4 and 5 are already operational. Thus, the alternate embodiments contemplate omitting such steps. An example of an alternate embodiment of the algorithm that would be used when the ABS mode of the electronic brake system is active is illustrated in FIG. 6, where blocks that are similar to blocks shown in FIG. 4 have the same numerical identifiers. As before, the algorithm is entered through block 52 and proceeds to reset the Brake Boost Flag, BBFLAG, in functional block 54. The algorithm then proceeds to decision 64 where the difference between front and rear wheel speeds is determined. The step of checking for closure of the brake light switch 13 that was included in FIG. 4 is not needed in FIG. 6 since closure of the brake light switch is typically required to activate the ABS mode. Also, if the ABS mode is active, it is not necessary to measure the wheel speeds as shown in FIG. 4 since the wheel speeds will have been previously determined by the ABS algorithm. Therefore, the algorithm transfers directly to decision block 64.

During the initial pressure increase iteration, the BBFLAG is again set in functional block 68. However, after setting the flag, the algorithm proceeds directly to functional block 74 to increment the rear brake pressure. The steps of isolating the rear brake circuit and starting the pump motor that were shown in FIG. 4 are not needed in FIG. 6 since they would have been completed when the ABS was activated. The algorithm then continues as described above.

Figure 7:
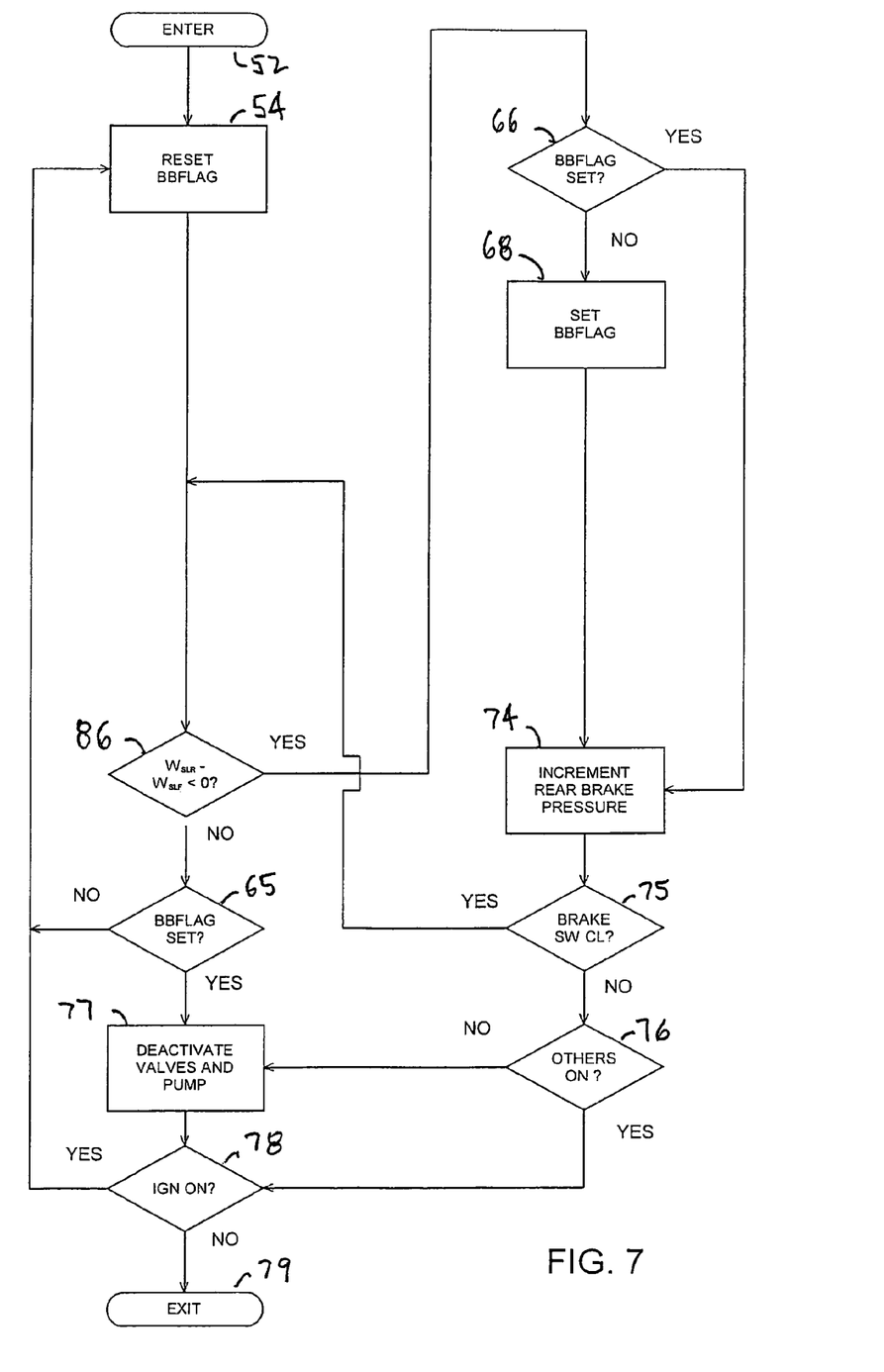
FIG. 7 is a flow chart for an alternate embodiment of the algorithm shown in FIG. 6.

Another embodiment of the algorithm is illustrated in FIG. 7 where wheel slip is used to activate the rear brake boost, similar to the algorithm illustrated in FIG. 5. Blocks that are similar to blocks shown in FIGS. 5 and 6 have the same numerical identifiers in FIG. 7. Similar to the algorithm illustrated in FIG. 6, the algorithm shown in FIG. 7 utilizes the wheel slips determined by the ABS. Thus, the only difference from FIG. 6 that is apparent in FIG. 7 is the use of decision block 85 to determine that rear brake boost should be activated when the rear wheel slip is less than the front wheel slip.

Accordingly, it is seen that the rear brake boost algorithm may be simplified when one of the operating modes of the electronic brake control system is active. Similar algorithms are contemplated for use when the TCS or VCS is active. Additionally, because the present invention utilizes either wheel speeds or wheel slip, a pressure sensor, as required for prior art systems, is not required. The deletion of the pressure sensor from the system both simplifies the system and significantly reduces the system cost.

Figure 8:
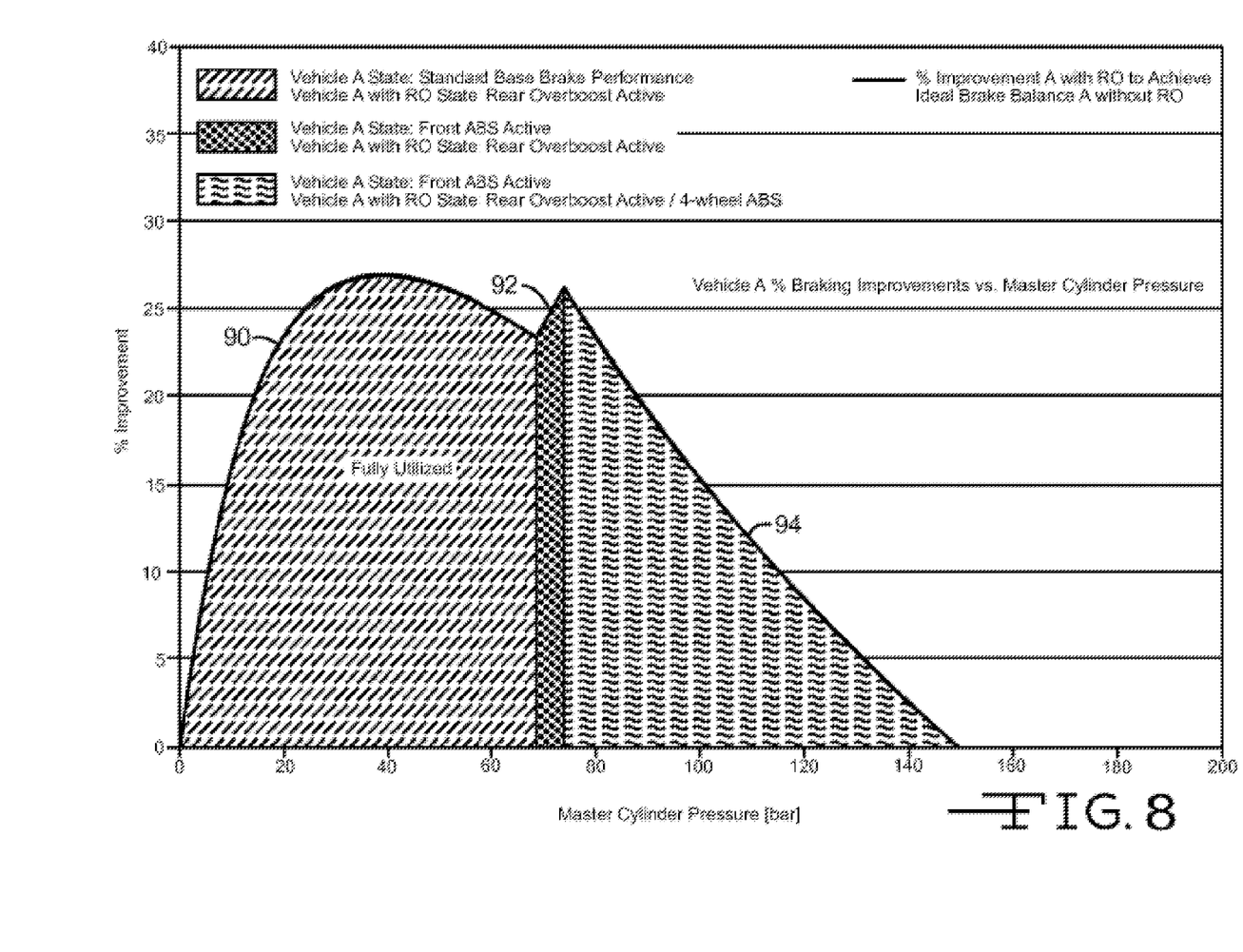
FIG. 8 is a graph illustrating the enhanced performance of a brake system that includes the present invention.

The effect of the rear brake boost function is illustrated by the graph shown in FIG. 8 where the vertical axis represents percent improvement in braking while the horizontal axis represents the master cylinder pressure in bar. A baseline articulated vehicle, designated by "A", represents a towing vehicle and a towed trailer. The towing vehicle has been optimized to have maximum rear brake torque available for either a fully loaded condition or a trailer towing condition while still meeting a lightly loaded balance criteria. The towed trailer is selected to bring the articulated vehicle to its designated gross combined towing vehicle and trailer combined weight rating. In its baseline condition, the brake force input is only provided by the driver without the use of rear brake boost. Use of rear brake boost is indicated on FIG. 8 by the label "RO", which represents "Rear Overboost". A percent improvement line represents the braking benefits obtained by vehicle A when the rear brake boost function is activated in a manner that achieves the ideal brake balance for the tow vehicle for any master cylinder pressure provided by the driver. The left portion of the percent improvement line, which is labeled 90, represents a vehicle without ABS active, while the center portion, which is labeled 92, represents a vehicle with only front wheel ABS active. Finally, the right portion of the percent improvement line represents a vehicle with both front and rear wheel ABS active. As is apparent from FIG. 8, the rear brake boost function significantly enhances the braking ability of a vehicle with or without ABS active.

While the preferred embodiment of the invention has been described with the rear brake boost function included in an electronically controlled bake system, it will be appreciated that the rear brake boost algorithm may used independently of the electronic brake control algorithm. With independent use as a stand alone brake boost control algorithm, only selected components of the electronic brake control system 10 would need to be provided (not shown). The needed components include an isolation valve and a pressurized fluid supply at a pressure greater than the master cylinder pressure for the rear brake circuit. For controlling the rear brake circuit pressure, apply and dump valves also would be needed. Additionally, wheel speed sensors would be needed for monitoring front and rear wheel speeds as described above. When the needed components are provided, the rear brake boost function may be provided as shown by the flow chart in FIG. 4 and described above.

Figure 9:
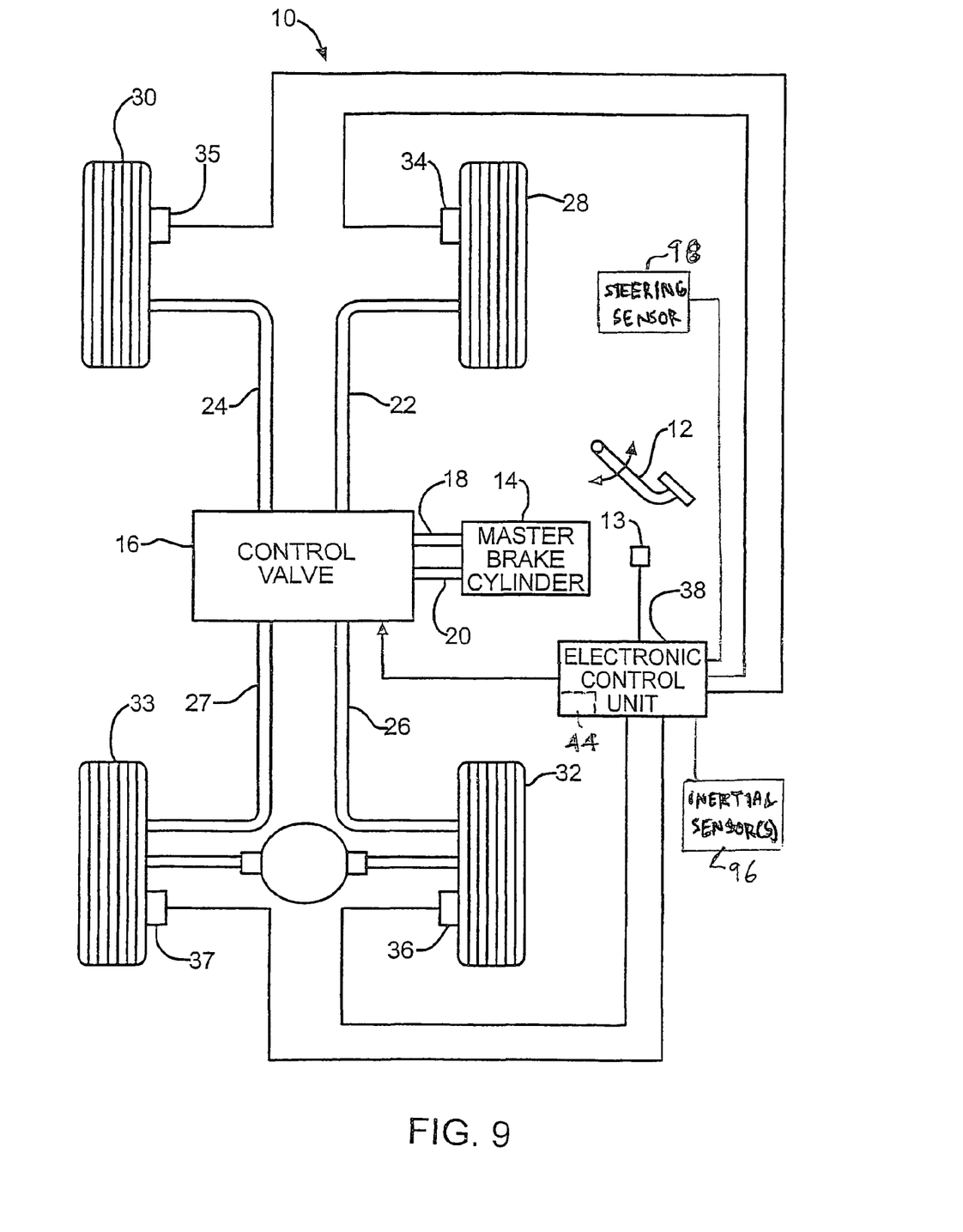
FIG. 9 is a schematic diagram of an alternate embodiment of the electronically controlled brake system shown in FIG. 3.

As shown in FIG. 9, the ECU 38 also may be connected to one or more inertial sensors 96 for measuring vehicle acceleration, yaw and/or roll, and a steering angle sensor 98. While only one connecting wire is shown in FIG. 9 connecting the inertial sensors 96 to the ECU 38, it will be appreciated that more than one connecting wire may be used. Additionally, while the inertial sensors 96 are shown in one location in FIG. 9, the sensors may also be located at separate locations within the vehicle. With the inclusion of inertial and steering sensors, other parameters may be utilized for activation of the rear brake boost function. Thus, the presence of a trailer could be determined by changes in the vehicle dynamics measured by the inertial sensors 96. If a trailer is determined to be present, a trailer present flag would be set. Similarly, if the vehicle is a truck, the presence of heavy load may also be determined by changes in the vehicle dynamics measured by the inertial sensors 96. Accordingly, a heavy load flag would be set to indicate that a condition exists that would potentially require activation of the rear brake boost algorithm.

Figure 10:
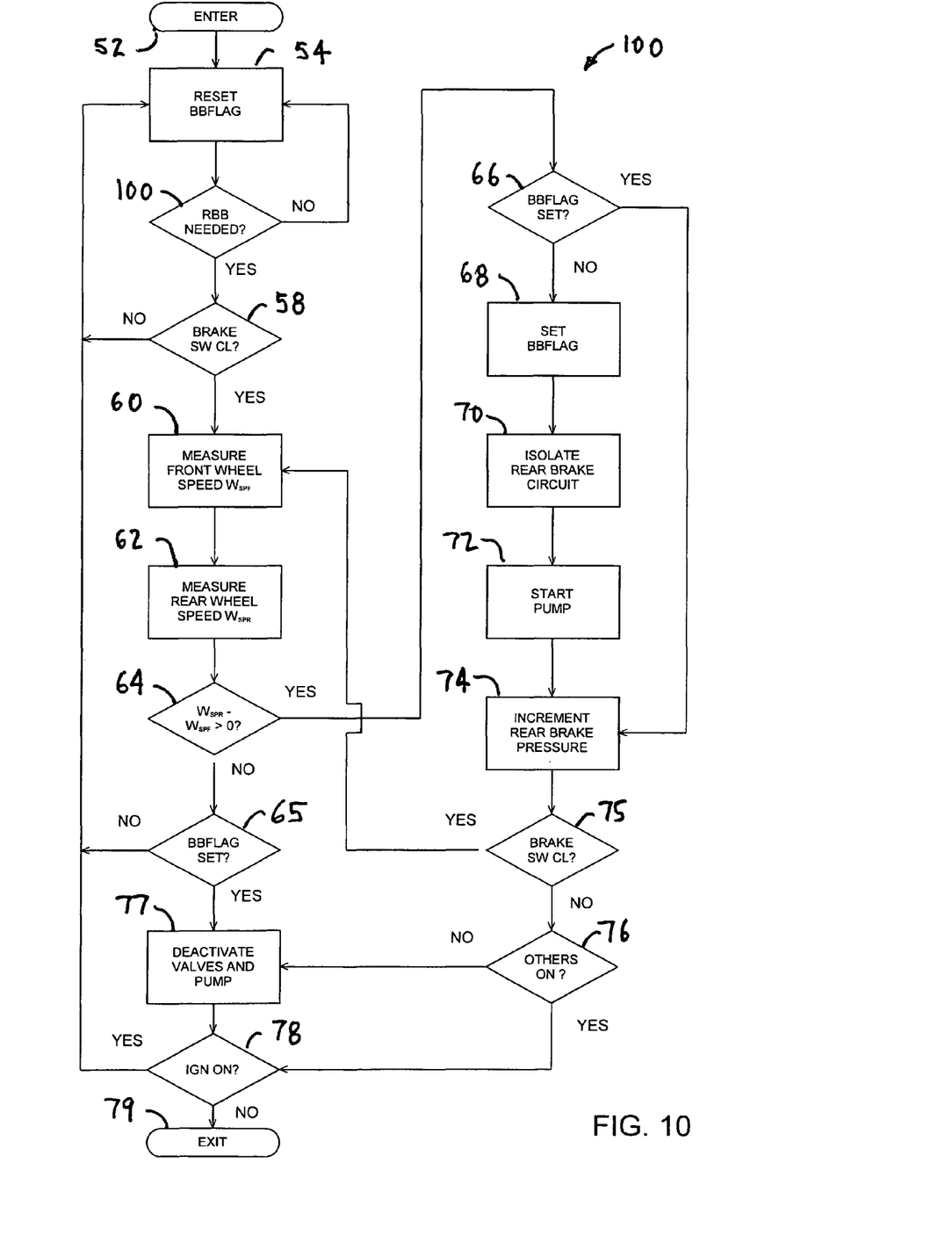
FIG. 10 is a flow chart for another alternate embodiment of the algorithm shown in FIG. 4 that applies to the brake system shown in FIG. 9.

The addition of the inertial sensors 96 enable another embodiment of the flow chart shown in FIG. 4 that is shown generally at 99 in FIG. 10, where components in FIG. 10 that are similar to components shown in FIG. 4 have the same numerical identifiers. Thus, in decision block 100, the algorithm checks the status of a trailer present flag and/or heavy load flag to determine whether a condition exists that would potentially require activation of the rear brake boost algorithm. If such a flag is set in decision block 100, the algorithm transfers to decision block 58 and proceeds as described above. If such a flag is not set in decision block 100, the algorithm transfers to functional block 54 and continues as described above. It will be appreciated that the invention also contemplates modifying the flow charts shown in FIGS. 5, 6 and 7 in a similar manner as shown in FIG. 10. The sensors also may be utilized to estimate the amount of loading with the maximum brake boost pressure limited as a function of the loading (not shown). Thus, the invention contemplates storing a set of maximum brake boost pressures in the microprocessor memory and selecting one based upon the estimated loading. Similarly, the incremental pressure increases applied to the rear brake circuit may be selected as a function of the sensor output signals. Furthermore, with the motion and directional sensors described above, the functional relationships described above for the comparison of the wheel speeds and slips in decision blocks 64 and 86 may also include steering angle, yaw rate, lateral acceleration and/or vehicle velocity.

The steering sensor 98 described above may be utilized to further refine the operation of the invention. The use of individual wheel speeds in decision blocks 64 and 86 may be advantageous during a turning maneuver with the selection of right or left wheel speeds determined by the direction of the turn. Additionally, the invention also may be practiced using both average and individual wheel speeds in decision block 64 with the average wheel speeds used when the steering sensor 42 indicates straight line motion and the individual wheel speeds used when the steering sensor 42 indicates that the vehicle is turning.

The invention also contemplates a number of possible vehicle parameters, any of which might indicate that activation of the brake boost algorithm may be needed and utilized in decision block 100 in FIG. 10. For example, one of the possible condition is present when the vehicle is towing a trailer. This could be determined by a trailer detection subroutine setting a trailer present flag when a trailer is connected to the vehicle. Furthermore, if the trailer brakes are controlled by a trailer brake controller mounted under the towing vehicle dashboard, the trailer brake controller could set the trailer present flag upon detecting the presence of the trailer stop lights or another similar parameter. Furthermore, the incremental increases in the rear brake circuit pressure may be a function of the settings of the trailer brake controller. Alternately, detection of compression of the rear vehicle springs by load sensors could set the heavy load flag. It will be appreciated that other conventional detection devices may be used by the invention to set the heavy load flag. Thus, the flow chart shown in FIG. 10 could be further modified to determine if one of the heavy load or trailer present flags is not set in decision block 100, with algorithm transferring back block 54. If one of the heavy load or trailer present flags is set, the algorithm would transfer to decision block 58, as described above.

While the invention has been illustrated and described above in terms of a front axle/rear axle, vertically split, brake system including a first brake circuit with the front wheel brakes and second brake circuit including the rear wheel brakes, it will appreciated that the invention also may be practiced upon a diagonally split brake system. A diagonally split brake system has a first brake circuit that includes one front wheel brake the rear wheel brake on the opposite side of the vehicle and a second brake circuit including the other front wheel brake and the diagonally opposite rear wheel brake. Similarly, the inventors contemplate that invention also may be practiced upon other brake systems having architectures not specifically described or mentioned above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, it will be appreciated that the flow charts illustrated in FIGS. 4, 5, 6, 7 and 10 are intended to be exemplary and that the invention also may practiced with algorithms that differ from the flow charts shown in the figures. Furthermore, while the preferred embodiment has been illustrated and described for a hydraulic brake system, it is also contemplates that the invention may be practiced with other brake systems, such as, for example, pneumatic, electric hydraulic and electric brake systems.

What is claimed is:

1. A rear brake boost system for a vehicle comprising:
    a front wheel brake circuit;
    a rear wheel brake circuit;
    a plurality of wheel speed sensors, with at least one front wheel speed sensor and at least one rear wheel speed sensor; and
    a control unit connected to said front and rear wheel brake circuits and said wheel speed sensors, said control unit operative during a brake application to monitor a front wheel speed and a rear wheel speed, said control unit further operable to increase the pressure applied to said rear wheel brakes to a value that is greater than the pressure applied to said front wheel brakes when said rear wheel speed exceeds said front wheel speed.

2. The system according to claim 1 wherein said control unit is operative to increase the rear brake pressure above the front brake pressure only when one of the conditions of carrying a heavy load and towing a trailer is present.

3. The system according to claim 2 wherein the rear brake pressure is increased in increments that are a function of the size of the load being moved by the vehicle.

4. The system according to claim 3 wherein said pressure increments are directly proportional to the load weight.

5. The system according to claim 1 wherein said pressure applied to said rear wheel brakes is increased in increments with said pressure increments being a function of said difference between said front wheel speed and said rear wheel speed.

6. The system according to claim 5 wherein said pressure increments applied to said rear wheel brakes are directly proportional to said difference between said front wheel speed and said rear wheel speed.

7. The system according to claim 6 wherein said front wheel speed is an average of individual front wheel speeds and said rear wheel speed is an average of individual rear wheel speeds.

8. The system according to claim 1 wherein wherein said control unit is operable to increase the pressure applied to said rear wheel brakes to a value that is greater than the pressure applied to said front wheel brakes when said rear wheel speed exceeds a threshold that is a function of said front wheel speed.

9. The system according to claim 8 wherein said threshold is determined from the following formula:

$$\text{Threshold} = K * W_{SPF}, \text{ where}$$

K is a constant that is one of equal to and greater than one, and $W_{SPF}$ is the front wheel speed.

10. The system according to claim 1 wherein the system also includes a device for determining the loading of the vehicle and further wherein said pressure applied to said rear wheel brakes is increased in increments with said pressure increments being a function of said vehicle loading.

11. The system according to claim 10 wherein said pressure increments applied to said rear wheel brakes are directly proportional to said vehicle loading.

12. The system according to claim 1 wherein the system is included in a traction control system.

13. The system according to claim 1 wherein the system is included in a vehicle stability control system.

14. The system according to claim 1 wherein the system is included in a diagonally split brake system.

15. The system according to claim 1 wherein the system is included in a vertically split brake system.

16. A method for controlling the application of vehicle rear brakes for a vehicle having front and rear brake circuits, the method comprising the steps of:
    (a) providing a plurality of wheel speed sensors, with at least one front wheel speed sensor and at least one rear wheel speed sensor and a control unit connected to the front and rear wheel brake circuits and the wheel speed sensors;
    (b) monitoring the front and rear wheel speeds;
    (c) comparing the monitored front and wheel speeds; and
    (d) increasing the pressure applied to the rear wheel brakes to a value that is greater than the pressure applied to the front wheel brakes, during a brake application and upon determining that the rear wheel speed exceeds the front wheel speed.

17. The system according to claim 16 wherein said control unit is operative to increase the rear brake pressure above the front brake pressure in step (d) in increments with the pressure increments being a function of the difference between the front wheel speed and the rear wheel speed.

18. A method for controlling the application of vehicle rear brakes for a vehicle having front and rear brake circuits, the method comprising the steps of:
    (a) providing a plurality of wheel speed sensors, with at least one front wheel speed sensor and at least one rear wheel speed sensor and a control unit connected to the front and rear wheel brake circuits and the wheel speed sensors;
    (b) monitoring the front and rear wheel speeds; and
    (c) increasing the pressure applied to the rear wheel brakes to a value that is greater than the pressure applied to the front wheel brakes, during a braking application and when the rear wheel speed exceeds a threshold that is a function of the front wheel speed.

19. The method according to claim 18 wherein the threshold is determined from the following formula:

$$\text{Threshold} = K * W_{SPF}, \text{ where}$$

K is a constant that is one of equal to and greater than one, and $W_{SPF}$ is the front wheel speed.

20. The method according to claim 19 wherein the front and rear brake circuits are included in a diagonally split brake system.

21. The method according to claim 19 wherein the front and rear brake circuits are included in a vertically split brake system.

* * * * *

UNITED STATES PATENT AND TRADEMARK OFFICE
CERTIFICATE OF CORRECTION

| | | |
|---|---|---|
| PATENT NO. | : 7,809,486 B2 | Page 1 of 1 |
| APPLICATION NO. | : 11/411240 | |
| DATED | : October 5, 2010 | |
| INVENTOR(S) | : Mark Haller et al. | |

It is certified that error appears in the above-identified patent and that said Letters Patent is hereby corrected as shown below:

Claim 16, Column 14, Line 43, after "front and" insert --rear--.

Signed and Sealed this
First Day of February, 2011

David J. Kappos
*Director of the United States Patent and Trademark Office*